United States Patent [19]

Young, Jr. et al.

[11] 4,346,143

[45] Aug. 24, 1982

[54] METHOD OF APPLYING ZINC-RICH PRIMER AND PRODUCT

[75] Inventors: Charles L. Young, Jr., Westerville, Ohio; Ralph C. Gray, Allison Park, Pa.

[73] Assignee: PPG Industries, Inc., Pittsburgh, Pa.

[21] Appl. No.: 849,292

[22] Filed: Nov. 7, 1977

[51] Int. Cl.$^3$ .................. B32B 15/04; B32B 15/08
[52] U.S. Cl. ................ 428/332; 204/181 C; 427/309; 427/386; 427/410; 428/418; 428/457
[58] Field of Search ............... 427/192, 309, 327, 406, 427/383.7, 372.2, 409, 419.8, 410, 386, 388.1; 156/664; 134/3, 41; 428/562, 332, 560, 418, 457; 260/37 EP; 148/6.14 R; 204/181 C, 181 T

[56] References Cited

U.S. PATENT DOCUMENTS

| | | | |
|---|---|---|---|
| 2,304,069 | 12/1942 | Beckwith | 427/406 |
| 2,704,883 | 3/1955 | Hamilton et al. | 148/6.14 R |
| 2,768,103 | 10/1956 | Schuster et al. | 148/6.2 |
| 2,915,420 | 12/1959 | Hardy | 148/6.14 R |
| 2,916,458 | 12/1959 | McFarland | 156/664 |
| 3,228,810 | 1/1966 | Coburn | 427/406 |
| 3,377,193 | 4/1968 | Stilmar | 428/562 |
| 3,468,768 | 9/1969 | Rauch | 156/664 |
| 3,671,331 | 6/1972 | Malkin et al. | 148/6.2 |
| 3,698,932 | 10/1972 | Dean | 427/406 |
| 3,717,509 | 2/1973 | Palm et al. | 148/6.2 |
| 3,849,141 | 11/1974 | Palm et al. | 427/406 |
| 3,944,712 | 3/1976 | Kurcz | 428/560 |

FOREIGN PATENT DOCUMENTS

| | | | |
|---|---|---|---|
| 5811 | of 1911 | United Kingdom | 427/192 |
| 1007902 | 10/1965 | United Kingdom | 427/192 |

*Primary Examiner*—Norman Morgenstern
*Assistant Examiner*—S. L. Childs
*Attorney, Agent, or Firm*—William J. Uhl

[57] ABSTRACT

An improved process for providing corrosion protection to ferrous metal substrates is disclosed. The improved process involves a first treating of the surface of the ferrous metal substrate with nitric acid followed by directly applying to the previously treated surface a zinc-rich coating composition. Upon curing the zinc-rich coating composition, an adherent electroconductive coating is formed. The coating provides excellent corrosion protection and since it is electroconductive, the coating is weldable and can accept a subsequent electrocoat.

20 Claims, No Drawings

METHOD OF APPLYING ZINC-RICH PRIMER AND PRODUCT

BACKGROUND OF THE INVENTION

1. Field of the Invention

The present invention relates to an improved method for providing corrosion resistance to ferrous metal surfaces. More particularly, this invention relates to the application of zinc-rich primers to ferrous metal substrates in a new and improved manner so as to result in coated ferrous metal substrates with excellent physical properties including corrosion resistance and adhesion of the zinc-rich coating to the substrate particularly under a shearing force.

2. Brief Description of the Prior Art

The use of zinc-rich primers is becoming increasingly important in the automotive industry. The general thinking in the automotive industry is that cars and trucks must be built to last much longer. To do this, it is necessary that the steel bodies of the cars and trucks be made increasingly corrosion resistant. Thus, topcoats with better sealing properties, such as electrodeposited topcoats, and primers which provide better adhesion and corrosion resistance are becoming increasingly more important. Zinc-rich primers, because of their ability to offer galvanic protection and their electroconductivity enabling them to accept electrical resistance welding and subsequent electrodeposited topcoats, offer great potential to the automotive industry.

An example of the prior art dealing with zinc-rich primers is U.S. Pat. No. 3,671,331 to Malkin et al. The coating systems described in this patent are quite complicated and involve a first pretreatment of the ferrous metal substrate with a mixture of hexavalent chromium such as chromic acid and zinc dust which is then sintered at a relatively high temperature of 475°–500° F. (246°–260° C.) to bond the zinc and chromium to the metal surface. Over this pretreated surface is then applied a zinc-rich primer which consists of about 60 to 80 percent by weight zinc dust, 10 to 30 percent by weight of an organic binder and 10 to 30 percent by weight of a suitable diluent. The primer-coated substrate is then baked to harden the primer and remove volatiles. Ferrous metal substrates coated in this way are electroconductive, enabling them to be welded and subsequently electrocoated.

There are a number of disadvantages associated with the process described in U.S. Pat. No. 3,671,331. First of all, it is a two-step process requiring a complicated first step. The ferrous metal must be pretreated with a mixture of hexavalent chromium and zinc dust and this mixture sintered onto the substrate. The sintering requires high temperature and significant energy consumption.

U.S. Pat. No. 3,671,331 specifically mentions that the first step is absolutely necessary to provide good properties and corrosion protection; the implication being that the application of the zinc-rich primer directly to the metal substrate would not be effective. In fact, the reference cautions against the use of resinous materials in the first step, saying that the presence of more than very minor amounts of resin can deleteriously affect coating integrity with respect to weldability and galvanic protection.

Somewhat surprisingly, it has been found that zinc-rich primers can be applied simply and directly to ferrous metal substrates without the need to pretreat the substrate with hexavalent chromium-zinc dust composition disclosed in the prior art. It has been found that if the ferrous metal substrate is first etched with nitric acid and the zinc-rich primer applied directly to the previously etched surface, the primed surface has outstanding properties. The adhesion, ductility, flexibility and corrosion resistance of the coated substrate are as good or better than that of the prior art.

SUMMARY OF THE INVENTION

In accordance with the present invention, an improved method of providing corrosion resistance to a ferrous metal substrate is provided. The improvement of the invention involves first treating the surface of the ferrous metal substrate with nitric acid, followed by directly applying to the previously treated surface a zinc-rich coating. Optionally, a topcoat such as a subsequently applied electrocoat may be applied to the zinc-rich coating. The invention also provides for ferrous metal substrates coated in the above-described manner.

PERTINENT PRIOR ART

U.S. Pat. No. 3,671,331 to Malkin et al mentioned above teaches that before pretreating the ferrous metal substrate with the hexavalent chromium-zinc dust composition, the substrate can be first etched with nitric acid as taught in U.S. Pat. No. 2,768,103. However, there is no suggestion in U.S. Pat. No. 3,671,331 that the hexavalent chromium pretreatment can be eliminated and the zinc-rich primer applied directly to the nitric acid-etched surface. In fact, the referenced patent, U.S. Pat. No. 2,768,103, specifically teaches that the nitric acid etching is to be used in combination with the subsequent application of a hexavalent chromium pretreatment. According to the patent, it is the combination that provides corrosion resistance. Supposedly, the nitric acid treatment slightly etches the surface of the metal and oxides part of the surface so as to produce a thin combined ferrous and ferric oxide film. During the subsequent treatment with hexavalent chromium, iron chromates are formed on the treated metal surface and part of the ferrous oxide present is considered to be oxidized to the ferric state. Simultaneously, the hexavalent chromium in the chromic acid is partially reduced to trivalent chromium at the metal surface. By this series of reactions, a homogeneous solid solution is produced on the metal surface. In addition, U.S. Pat. No. 2,768,103 does not teach, nor remotely suggest, applying a zinc-rich primer to the metal surface at any stage of the process.

U.S. Pat. No. 3,370,992 to Illenda et al discloses a pretreatment of metal surfaces, particularly ferrous metal surfaces involving treating the metal surface in a bath containing phosphoric acid and a chlorate maintained at a pH of 2.7. Pretreatment of the metal surfaces in this manner makes them much more receptive to adherent corrosion-resistant coatings and organic finishes. Examples of corrosion-resistant coatings are coatings containing hexavalent chromium and phosphorus. Examples of organic finishes are those based on resinous materials such as epoxy resins, phenol-formaldehyde resins and polyester resins. The reference discloses that nitric acid can be added to the bath to avoid undesirable formation of sludge. However, there is no disclosure in the patent of using nitric acid for treating the metal surface such as provided in the present invention, nor of using a zinc-rich primer.

U.S. Pat. No. 3,717,509 to Palm et al is very similar to U.S. Pat. No. 3,671,331 mentioned above. The Palm et al patent discloses a metal surface with a combined coating composition comprising an undercoating of the residue obtained by applying to the surface a hexavalent chromium-containing composition and a reducing agent therefor and a topcoating comprising a particulate electrically conductive pigment such as zinc dust in a resinous vehicle. Before applying the hexavalent chromium undercoating, the patent discloses that the metal can be etched with hydrofluoric acid. The patent fails to disclose the use of nitric acid. It has been found in the practice of the present invention that hydrofluoric acid is not effective with zinc-rich primers in establishing corrosion resistance.

The Palm et al patent is also interesting because it shows in one of its working examples the application of a zinc-rich primer directly to a steel substrate without interposing a hexavalent chromium-containing undercoating. The coated substrate failed after only 96 hours in salt spray. Failure was exhibited by extensive blistering as well as substantial red rust over the panel surface. Thus, the Palm et al patent would seem to indicate that a zinc-rich primer cannot be directly applied to a ferrous metal surface without pretreatment with hexavalent chromium. However, the present invention has found that the zinc-rich primer can be directly applied to the metal surface if the surface is first etched with nitric acid.

DETAILED DESCRIPTION

As mentioned above, the present invention is concerned with an improved method for providing corrosion resistance to a metal surface.

The metal substrate which is treated in accordance with the present invention is a ferrous metal substrate such as iron, cold rolled steel, hot rolled steel and pickled steel. The ferrous metal substrate can come in a variety of shapes such as sheet, plates, bars and rods. Usually, the ferrous metal treated in accordance with the method of the present invention is coil metal which comes in the form of a continuous strip wound on a spool. The coil metal is of a relatively thin gauge, that is, about 10 to 100 mils, and its width varies depending upon its intended use. The system should be capable of coating metal having widths of ½ to 72 inches and should be adaptable for both narrower and wider widths. Usually with coil metal, the method of the invention is practiced in a continuous manner with the coil being unwound from the spool and passed through various stations where it is cleaned, nitric acid pretreated, further treated, primer coated, cured and optionally topcoated and cured before it is formed into its desired shape.

Before treating the ferrous metal surface, it is preferred to remove foreign matter from the metal surface by thoroughly cleaning and degreasing. Degreasing may be accomplished with known agents, for example, with agents containing sodium metasilicate, caustic soda, carbon tetrachloride, trichloroethylene and the like. The use of a commercial alkaline cleaning composition which combines washing and mild abrasion treatments can be employed for cleaning, for example, an aqueous trisodium phosphate-sodium hydroxide cleaning solution.

The nitric acid treating operation can be accomplished by contacting the ferrous metal with an aqueous nitric acid solution such as by immersing the ferrous metal substrate in a nitric acid bath. Besides immersion in a tank or vat of nitric acid, the nitric acid treatment can be accomplished by flooding the acid upon the metal surface, applying the nitric acid by spraying, by direct roll coating or by reverse roll coating. Spraying is less preferred because of nitrogen oxide fumes.

The concentration of the nitric acid will vary depending on metal quality and the contact time of the nitric acid with the ferrous metal. The concentration should be less than 20 percent and preferably from about 1 to 15 percent by weight nitric acid, with the remainder of the bath being principally water. Surfactants, defoaming agents, thickeners, deodorants and other additives can optionally be present in the nitric acid treating composition, although their concentration in total will generally not amount to more than 10 percent by weight treating composition. Concentrations of nitric acid greater than 20 percent by weight are not recommended because of handling hazards and because of adverse effects on corrosion protection. Concentrations of nitric acid less than one percent by weight are not recommended for coil line applications because of insufficient adhesion and corrosion protection. However, for other applications, lower concentrations at correspondingly higher dwell times could be used.

The contact time or time the ferrous metal is in contact with the nitric acid should be for at least one second and preferably for about 5 to 60 seconds. Contact times significantly less than one second are not recommended because of insufficient adhesion and corrosion protection. Contact times of much greater than 60 seconds are not recommended for coil line applications because of undesirable deposits on the metal and because of poor adhesion. The contact time will also depend on the concentration of the nitric acid. In general, at higher nitric acid concentrations, less contact time is required and at lower nitric acid concentrations, a greater contact time is required.

The temperature of the treating solution does not seem to be unduly critical. Temperatures within the range of about 15° to 60° C. are satisfactory.

Following the nitric acid treatment, the ferrous metal is usually rinsed with water, such as deionized water or tap water, in order to remove any residue which might be carried over. Usually after washing, the metal is air dried with an air knife, by flashing off the water by brief exposure to a high temperature, or by passing the metal between squeegee rolls.

It has been observed that the nitric acid solution etches the surface of the metal as measured by loss of weight of the treated panel. Ferrous metal substrates etched with nitric acid in accordance with the present invention lose from about 100 to about 325 milligrams per square foot of metal surface treated. However, other acids such as sulfuric and hydrochloric do not provide the outstanding results of nitric acid.

The zinc-rich primer composition which is applied to the ferrous metal surface after treatment with nitric acid comprises three essential ingredients, pulverulent zinc or zinc dust to provide electroconductivity and cathodic protection; a resinous binder to secure the pulverulent zinc to the metal substrate and the diluent which is needed to adjust the viscosity of the primer composition so that it can be applied to the metal substrate by conventional coating techniques. Diluent is intended to include solvents and non-solvents alike.

The particle size of the pulverulent zinc does not seem to be unduly critical and particle sizes over a fairly wide range have been found to give some measure of performance. Preferably, the majority of particles should have a size finer than 20 microns, preferably within the range of 2 to 16 microns. When a significant fraction of the zinc particles have too large a particle size, the weldability, galvanic protective ability and adhesion may be adversely affected.

In formulating the zinc-rich primers, the binder component is a resinous material selected to afford particular characteristics to the applied coating. The preferred binder component is a resinous material prepared from an epoxy-containing material, although other resinous materials may be used such as polystyrene, chlorinated or isomerized rubber, polyvinyl acetate and polyvinyl chloride-polyvinyl acetate copolymers, alkyd-melamine resins, cyanoacrylates and inorganic silicates may be used.

Particularly preferred resinous materials are those obtained by condensing an epihalohydrin such as epichlorohydrin with a dihydric phenol such as Bisphenol A in the presence of base. Preferred resinous materials are those having the following structure:

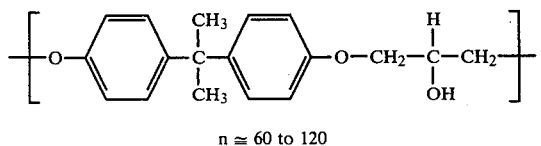

n ≅ 60 to 120

Besides Bisphenol A, other phenolic compounds may be used such as bis(4-hydroxy-phenyl)2,2-propane; 4,4'-dihydroxybenzophenone and bis(4-hydroxy-phenyl)1,1-ethane.

The epoxy material used in preparing the resin may be selected, as mentioned above, from an epihalohydrin or a dihalohydrin. Besides epichlorohydrin, other epoxy materials may be used, such as 1-chloro-2,3-epoxybutane and 1-bromo-2,3-epoxypentane.

The preferred resins have weight average and molecular weights of at least 18,000 and preferably within the range of about 50,000 to 100,000. Such resins are commercially available from Union Carbide Corporation as BAKELITE ® Phenoxy Resins.

Lower molecular weight epoxy resins may also be used particularly if they are combined with a curing agent such as amine-aldehyde or phenolaldehyde curing agents. Examples of suitable lower molecular weight epoxies are polyglycidyl ethers of polyphenols having molecular weights over the range of about 1000 to 12,000. Such resins are commercially available from Shell Chemical Company under the trademark EPON ®. Suitable aminealdehyde curing agents are etherified derivatives of urea-, melamine- and benzoguanamine-formaldehyde condensates commercially available from American Cyanamid Company under the trademark CYMEL ®, and from Monsanto Company under the trademark RESIMENE ®. Suitable phenol-aldehyde condensates are mixed allyl ethers of mono-, di- and trimethylol phenols commercially available from General Electric Company under the trademark METHYLON ®.

Since the zinc-rich primers generally are applied preparatory to subsequent welding of the substrate, the amounts of pulverulent zinc and resinous binder must be controlled. The zinc-rich primers must contain a substantial amount of pulverulent zinc or zinc dust, that is, at least about 30 volume percent zinc dust and preferably from about 45 to 60 percent by volume of zinc dust; the percentage by volume being based on total volume of zinc dust and binder.

Besides the binder and pulverulent zinc, the zinc-rich primer composition will also contain a diluent so that the primer composition will have the proper viscosity for application by conventional coating techniques. The diluent should be selected from those which would not detrimentally affect the adhesion of the coating to the substrate. Suitable diluents include ketones such as methyl ethyl ketone, methyl isobutyl ketone and isophorone; esters and ethers such as 2-ethoxyethyl acetate and 2-ethoxyethanol; aromatic hydrocarbons such as benzene, toluene and xylene and aromatic solvent blends derived from petroleum such as those sold commercially under the trademark SOLVESSO ®. The amount of diluent will vary depending on the method of coating, the binder component, the zinc-binder ratio, and the presence of optional ingredients such as those mentioned below.

In addition to the essential ingredients described above, the zinc-rich primers may contain some optional ingredients such as extenders, for example, iron oxides and iron phosphides, flow control agents, for example, urea-formaldehyde resins, thixotroping agents such as silica and montmorillonite clay; anti-settling agents such as aluminum stearate and polyethylene powder. Optionally, a dehydrating agent, which inhibits gas formation, such as silica, lime or a sodium aluminum silicate, can be included in the formulation.

It may be desirable to add other pigments to the formulation such as carbon black, magnesium silicate (talc), zinc oxide and corrosion inhibiting pigments such as chromates and molybdates, for example, calcium chromate, lead chromate, zinc chromate, barium chromate, strontium chromate, calcium molybdate, lead molybdate, zinc molybdate, barium molybdate and strontium molybdate. In general, these optional ingredients will constitute no more than about 50 percent by weight of the primer based on total weight of pulverulent zinc, resinous binder and optional ingredients.

Special note should be given to the inclusion of chromates (a source of hexavalent chromium) in the zinc-rich primer composition. It has been found that primers containing from about 2 to 25, preferably 5 to 20 grams of chromium expressed as $CrO_3$ per liter of paint with a weight ratio of $CrO_3$ to Zn within the range of 0.001 to 0.05:1 provide outstanding corrosion protection. In addition, it has been found that a mixture of chromates, at least one of which has a relatively high solubility in water, that is, greater than 10 grams per liter at 25° C., and at least one of which has a relatively low solubility in water, that is, less than 2 grams per liter at 25° C., are especially preferred. The weight ratios of the relatively soluble to the relatively insoluble chromate can vary over a fairly wide range from as high as 5:1 to 1:5, although the most preferred compositions use weight ratios of about 2:1 to 1:2.

Examples of relatively water-soluble chromates are calcium chromate, sodium dichromate, potassium dichromate and ammonium dichromate and mixtures thereof. Examples of relatively water-insoluble chromates are zinc potassium chromate, zinc chromate, barium chromate, strontium chromate, lead silico chromate and mixtures thereof.

The zinc-rich primer can be applied to the ferrous metal substrate by many conventional ways, for example, dip coating, direct roll coating, reverse roll coating, curtain coating, air and airless spray, electrostatic spray, brushing including rotary brush coating, pressure spray or a combination of such techniques.

The thickness of the zinc-rich primer coating can vary depending upon the use to which the coated metal substrate will be subjected. Generally to achieve sufficient corrosion resistance for coil metal in automotive use, the applied primer should have a dry film thickness of at least 0.5 mil, but, in general, for reasons of economy, should not be greater than about 0.8 mil. However, for other substrates and other applications, thinner and thicker coatings, on the order of 0.1 to 10 mils, may be used.

After application, the primer is cured, which can be accomplished by air drying at room temperature, or by accelerated air drying at elevated temperature, or by baking at elevated temperature, depending upon the binder used in the primer composition. Many of the binders such as those prepared from epoxy materials require curing at elevated temperature for a period of time sufficient to vaporize the diluents in the composition and to cure or set the binder composition. In general, baking temperatures will be dependent on film thickness and on the particular binder used. For the preferred binders prepared from epxoy materials, peak metal temperatures of about 175° to 300° C. are required.

After the zinc-rich primer has been cured, the metal can be passed on to other operations, for example, forming into shape or welding or to a subsequent topcoating operation. While the metal is being passed on to these operations, the zinc-rich coating will protect the metal from any atmospheric corrosion.

Since the zinc-rich primer coated articles prepared in accordance with the invention are electroconductive, topcoating of the primer coated articles by electrodeposition is of particular interest. The electrodeposition of coatings is well known and a prolonged discussion of suitable compositions and the methods for depositing them is not needed. Particularly preferred compositions are anionic electrodepositable compositions such as those described in U.S. Pat. Nos. 3,366,563 to Hart et al and 3,537,969 to Jerabek, and cationic electrodepositable compositions such as described in U.S. Pat. Nos. 3,799,854 to Jerabek; 3,984,299 to Jerabek and 3,947,339 to Jerabek.

Illustrating the invention are the following examples which, however, are not to be construed as limiting the invention to their details. All parts and percentages in the examples are by weight unless otherwise specified.

EXAMPLE A

A zinc-rich primer composition was prepared from the following charge:

| Ingredient | Parts by Weight |
| --- | --- |
| CELLOSOLVE acetate[1] | 436.20 |
| phenoxy resin[2] | 140.0 |
| calcium chromate | 10.0 |
| zinc potassium chromate | 10.0 |
| Syloid ZN-1[3] | 10.0 |
| zinc dust[4] | 1000.2 |

-continued

| Ingredient | Parts by Weight |
| --- | --- |
| SOLVESSO-100/polyethylene paste[5] | 100 |

[1] 2-ethoxyethyl acetate.
[2] Resin obtained by condensing epichlorohydrin and Bisphenol A to a weight average molecular weight of about 72,000, commercially available from Union Carbide Corporation as BAKELITE ® Phenoxy Resin PKHH.
[3] $Na_2O:Al_2O_3:2.8\ SiO_2:X\ H_2O$ dehydrating agent commercially available from Grace-Davison Chemical.
[4] Commercially available from Federated Metal as L-15 (98 percent having a particle size less than 15 microns).
[5] Ninety (90) parts by weight aromatic solvent mixture commercially available from Exxon/10 parts by weight polyethylene powder commercially available from Allied Chemical as AC-6A.

A pigment paste was first prepared by blending 70 parts by weight of the CELLOSOLVE acetate with 20 parts by weight of the phenoxy resin in a high speed Cowles mixer until a clear viscous liquid was obtained. The calcium chromate, zinc potassium chromate and Syloid ZN-1 were slowly added to the phenoxy solution with continued Cowles mixing. The composition was then ground to a 7.5 Hegman in a steel ball attritor. The pigment paste was thinned with an additional 20 parts of CELLOSOLVE acetate and set aside.

Three hundred (300) parts of the CELLOSOLVE acetate were then mixed with 120 parts of the phenoxy resin in a high speed Cowles mixer until the resin dissolved. The zinc dust was then added to the solution with continued Cowles mixing and the mixture cooled to 100° F. (38° C.). The pigment paste prepared as described above was then added to the mixture followed by thinning with the remaining CELLOSOLVE acetate and the SOLVESSO-100/AC-6A.

The zinc-rich primer contained 60.4 percent by weight pigment, 8.8 percent by weight binder and 30.83 percent by weight solvent.

The zinc-rich primer had a chromium-to-zinc weight ratio expressed as $CrO_3/Zn$ of 0.011/1. The zinc-rich primer contained 11.08 grams of calcium chromate per liter and 11.84 grams of zinc potassium chromate per liter. The calcium chromate contributed 7.08 grams of $CrO_3$ per liter and the zinc potassium chromate contributed 5.27 grams of $CrO_3$ per liter.

The $CrO_3/Zn$ weight ratio, the grams per liter calcium chromate and zinc potassium chromate, and the grams per liter chromate contributed by the calcium and zinc potassium chromates are actual values based on the fact that the calcium chromate is 92 percent pure, the zinc potassium chromate is 99 percent pure and the zinc dust is 96 percent pure.

TEST METHODS

The adhesion of a zinc-rich primer to a steel substrate under a shearing force is an extremely important consideration to automobile manufacturers. In the automotive industry, zinc primer-coated steel sheets proceed through stamping operations which include drawing, pressing, trimming, punching and bending, each of which involves the application of a shearing force to the coated substrate and severely test the adhesion of the primer to the substrate.

To obtain an indication of how well a zinc-rich primer will adhere to the substrate under shear, three tests are generally recognized by the steel and automotive industry. One test is the simulated draw bead coating adhesion test. The second test is the Olsen cup coating adhesion test and the third test is the reverse impact coating adhesion test.

The simulated draw bead coating adhesion test is conducted according to General Motors Specification, Fisher Body Test Method 47-18. The equipment and materials required in this test are a tensile test machine, a simulated draw bead test fixture; a test sample which measured 2⅛ inch by 24 inches and a lightweight roller leveler oil. The simulated draw bead test fixture includes a male and female test plate. The male plate has a ridge or bead which extends across the direction of travel of the test sample and the female test plate has a recessed area extending across the direction of travel of the test sample which accommodates the bead.

The simulated draw bead test fixture is positioned in a tensile test machine so as to allow the test sample to be passed between the test plates. The tensile test machine should be capable of providing a 5000 pound load at a cross head speed of at least 3 inches per minute. Both the test plates and the test strip should be moderately lubricated with roller leveler oil.

After positioning the test sample between the test plates and securing the free end in the other cross head of the tensile tester, a 500 pound load is applied on the test strip through the test fixture. The feed mechanism of the tensile tester should then be engaged to provide at least 3 inches per minute movement of the cross heads. Once relative motion for the test sample and the fixture has been detected, the normal load on the test strip is increased through the test fixture until seizure of the test strip has occurred. The normal load on the test strip is then released momentarily. After the load has decreased to at least 500 pounds, the load is reapplied to a final testing load of 250 pounds below the load determined to be the seizure load. Throughout this portion of the test, the loading mechanism of the tensile test machine should be engaged. After the testing load has been achieved, a minimum of 4 inches of the test strip should be allowed to pass over the draw bead. This area is required to furnish a minimum area of 4 square inches after the strip has been subjected to a second pass over the draw bead as described below.

Once a sufficient length of the test strip has been passed through the test plates, both the tensile and normal loads should be released and the test strip removed. Both sides of the test area on the strip are then examined. If the sample exhibits poor coating adhesion, the test is terminated. If, however, good coating adhesion is indicated, the same test strip is subjected to a second pass. In this second pass, the test strip is placed into the test fixture so the same surface of the strip contacts the same test plate. In addition, the strip is positioned so that the crown of the bead contacts the lowest portion of the area tested previously. This is done to enable the same area of the test strip to be passed over the bead. Again, a 500 pound pre-load is applied prior to engaging the feed mechanism on the tensile tester. Once the strip has begun to move, the normal load on the test strip through the test fixture is increased until the testing load is obtained. The test strip is then allowed to slip through the test plate until the minimum area (4 square inches) is obtained for evaluation. Again, the normal load on the test strip and the tensile load are removed. The test strip is then removed and examined to determine the degree of coating adhesion.

Note, in between samples, the die areas should be conditioned with 600 grit wet or dry paper to remove any zinc-rich coating which has transferred to the test plate surfaces. If particles of coating (pick-off) have adhered to the test plates, mechanical or acid cleaning techniques can be used to remove the materials. The plates should then be conditioned with 600 grit wet or dry paper.

After testing, the test strips are examined to determine the quality of the coating adhesion as determined by the percentage removal of the coating.

The Olsen cup coating adhesion test (Olsen Draw) is conducted on a sheet metal tester. This type of machine is commonly used in the steel industry for determining the ductility of steel panels. The zinc primer-coated steel panel is held firmly between male and female dies, each having a central aperture to permit a metal ram to move upwardly through the dies for a pre-selected distance. The zinc primer coating is on the tension surface. The ram engages the uncoated side of the steel panel forcing the panel upwardly into the female die resulting in the pulling and stretching of part of the panel through a portion of the mating surfaces of the dies. The speed at which the ram is pushed up into the metal surface is about 2.5 inches per minute. The ram is permitted to move upwardly such that the panel is drawn through the mated surfaces to a depth of about 0.3 inch, which can be read on a draw dial provided on the tester. The ram is then returned to its original position. The configuration of the panel will show a dome area where the ram has pushed up through the panel. The dome area is taped with 3M No. 710 tape or the equivalent and the tape pulled off the dome area at an angle of 90°. The tape is then impressed on white paper and the degree of coating pick-off is determined by photographic standards. A 10 would be a perfect rating with no coating pick-off and 2 the worst rating indicating total coating pick-off.

In the reverse impact coating test, the test sample is positioned in a Gardner Reverse Impacter so that the zinc primer coating will be on the tension surface of the panel. The panel is then subjected to 80 inch-pounds of force (indenter 0.500 inch diameter, back-up plate diameter of 0.565 inch). The dome area created by the impact is then taped with 3M No. 710 tape or the equivalent and the tape pulled off at 90° from the dome area. The tape is then impressed on white paper and the degree of coating pick-off determined by photographic standards. A 10 would be a perfect rating with no coating pick-off and 2 would indicate total coating pick-off.

Besides shear adhesion, corrosion resistance of the zinc primer-coated steel panels is also very important to the automobile manufacturers. Zinc primer-coated steel test panels are tested for corrosion resistance generally in accordance with ASTM Specification B-117-64. In this test, panels are placed in a chamber held at a constant temperature where they are exposed to a fine spray (fog) of a 5 percent salt solution for a period of time as noted in the individual examples below. Upon removal from the chamber, the panels are rinsed in water and then dried and the extent of corrosion, that is, red rust and blistering, on the test panels is determined by visual inspection. Usually the panels are scribed with a line and the scribe creepage in millimeters measured. Also, the panels may be subjected to an Olsen Draw as described above and the dome area evaluated comparing with photographic standards for red rust. At 0 would be a perfect rating and an 8 the worst rating. Loss of adhesion and blistering are also noted.

EXAMPLES 1–4

A series of 4 inch by 6 inch cold rolled steel panels having a thickness of about 0.032–0.036 inch were cleaned by immersing them in a 3 percent by weight alkaline cleaning solution in deionized water at 160° F. (71° C.) for four minutes. The alkaline cleaner was commercially available from the Parker Co., Division of OMI, as PARCO 338. After immersion, the panels were rinsed with warm tap water (49° C.) and then blown dry with air.

One panel (Example 1) was then immersed in a 7.5 percent nitric acid solution in deionized water at about 22° C. for 5 seconds. The panel was then removed from the solution, rinsed with warm tap water and blown dry. The dry panel was coated with the zinc-rich primer described above (Example A) by drawing down with a No. 022 wire wound drawbar and baking the coated panel for 75 seconds in a 600° F. (315° C.) gas-fired oven to reach a peak metal temperature of 475° F. (246° C.). The baked film had a dry film thickness (DFT) of 0.55 mil.

A second panel (Example 2) was coated with a zinc-rich primer system available commercially from Diamond Shamrock Company under the trademark ZINCROMETAL ®. The system is believed to consist of an undercoating and a zinc-rich primer overcoating. The undercoating is believed to be the sintered residue of an aqueous dispersion of fine zinc dust and chromic acid. The zinc-rich primer overcoating having a DFT of about 0.55 mil was believed to consist of finely divided zinc dust dispersed in a phenoxy resin binder, pigment-to-binder ratio of about 5 to 1.

A third panel (Example 3) was pretreated with a proprietary pretreatment (B-1309) formulated by the Parker Company, Division of OMI, for use with subsequently applied zinc-rich primers. The pretreatment was believed to be a mixed chromate-phosphate type.

The pretreated panel was coated with the zinc-rich primer as described in Example 1, DFT was 0.55 mil.

A fourth panel (Example 4), a control, was coated directly after the alkaline cleaning step with the zinc-rich primer described above in connection with Example 1, DFT was 0.55 mil.

The panels were scribed with a line, given a 90° bend and exposed to a salt spray fog in accordance with ASTM B-117-64 for 500 and 1000 hours. After the salt spray exposure, the creepage from the scribe mark as well as the creepage from the panel edges were measured. The rust in the area of the 90° bend as well as the rust on the face of the panel was determined visually and is reported in Table I below.

TABLE I 500 and 1000 Hour Salt Spray Exposure Results for Various Zinc Primer-Coated Steel Substrates

| | 500 Hour Salt Spray Results | | | | 1000 Hour Salt Spray Results | | | |
|---|---|---|---|---|---|---|---|---|
| Example No. | Scribe Creepage in millimeters | Creepage from the Panel Edges in millimeters | Rust in Area of the Bend | Face Rusting | Scribe Creepage in millimeters | Creepage from the Panel Edges in millimeters | Rust in Area of the Bend | Face Rusting |
| 1 | 0 | 0 | 0 | no face rusting and no blistering | 0 | 0 | 0 | none |
| 2 | 1-2 | 1-2 | light red rust | no face rusting and no blistering | 2-4 | 2-4 | light red rust | light red rust |
| 3 | 1-2 | 2-3 | light red rust with some blistering | medium density blistering | 3-5 | 4-6 | heavy red rust with blistering | heavy red rust |
| 4 | 2-3 | 3-5 | red dust with blistering | medium density blistering | 4-5 | 5-6 | heavy red rust with blistering | heavy red rust with medium density blistering |

EXAMPLES 5-38

A series of experiments were conducted to show the effect of different nitric acid concentrations and immersion times in the etching process.

A series of cold rolled steel panels having a thickness of about 0.032-0.036 mil were cleaned by immersing in a 4 percent by weight alkaline (PARCO 338) cleaning solution at 160° F. (71° C.) for 3 to 4 minutes, rinsed with warm tap water, blown dry and then immersed in nitric acid baths at various concentrations and for various periods of time as shown in Table II below.

The panels were removed from the bath, rinsed with warm tap water and blown dry. The dry panels were coated with the zinc-rich primer as described above in connection with Example 1. The zinc primer-coated panels were subjected to an Olsen draw, 80 inch-pounds of reverse impact, scribed with a line and subjected to a salt spray fog according to ASTM B-117-64 for 240, 336 and 504 hours. The results of the testing are reported in Table II below.

TABLE II

Salt Spray Exposure Results for Various Nitric Acid-Pretreated, Zinc Primer-Coated Steel Panels

| Example No. | Nitric Acid Concentration | Immersion Time in seconds | Olsen Draw, Salt Spray in Hours | | | Scribe Creepage in millimeters, Salt Spray Exposure in hours | | |
|---|---|---|---|---|---|---|---|---|
| | | | 240 | 336 | 504 | 240 | 336 | 504 |
| 5 | 10% | 1 | 1 | 4 | 5 | 0 | 0 | 1 |
| 6 | 10% | 3 | 1 | 3 | 4 | 0 | 1 | 1 |
| 7 | 10% | 5 | 0 | 3 | 4 | 0 | 0 | <1 |
| 8 | 10% | 7 | 1 | 4 | 5 | 0 | 1 | 1-2 |
| 9 | 10% | 10 | 0 | 4 | 5 | 0 | <1 | 1 |
| 10 | 10% | 30 | 1 | 5 | 6 | <1 | <1 | 1 |

TABLE II-continued

Salt Spray Exposure Results for Various Nitric Acid-Pretreated, Zinc Primer-Coated Steel Panels

| Example No. | Nitric Acid Concentration | Immersion Time in seconds | Olsen Draw, Salt Spray in Hours | | | Scribe Creepage in millimeters, Salt Spray Exposure in hours | | |
|---|---|---|---|---|---|---|---|---|
| | | | 240 | 336 | 504 | 240 | 336 | 504 |
| 11 | 7.5% | 1 | 0 | 4 | 6 | 0 | <1 | 1 |
| 12 | 7.5% | 3 | 0 | 4 | 5 | 0 | 0 | <1 |
| 13 | 7.5% | 5 | 1 | 5 | 5 | 0 | 0 | <1 |
| 14 | 7.5% | 7 | 0 | 2 | 4 | 0 | <1 | 1-2 |
| 15 | 7.5% | 10 | 0 | 1 | 2 | 0 | <1 | 1-2 |
| 16 | 7.5% | 30 | 3 | 5 | 5 | <1 | 1-2 | 1-2 |
| 17 | 5% | 1 | 0 | 4 | 5 | 0 | 1 | 1-2 |
| 18 | 5% | 3 | 0 | 0 | 3 | 0 | 1 | 1-2 |
| 19 | 5% | 5 | 0 | 2 | 4 | 0 | <1 | 1-2 |
| 20 | 5% | 7 | 0 | 4 | 4 | 0 | <1 | 1 |
| 21 | 5% | 10 | 0 | 3 | 3 | 0 | 1 | 1 |
| 22 | 5% | 30 | 4 | 4 | 6 | 0 | 1 | 1-2 |
| 23 | 2.5% | 1 | 0 | 1 | 3 | 0 | 1 | 1-2 |
| 24 | 2.5% | 3 | 1 | 3 | 5 | 0 | <1 | 1-2 |
| 25 | 2.5% | 5 | 0 | 4 | 6 | 0 | 1 | 1-2 |
| 26 | 2.5% | 7 | 1 | 3 | 5 | — | — | — |
| 27 | 2.5% | 10 | 1 | 4 | 5 | <1 | 1-2 | 2-4 |
| 28 | 2.5% | 30 | 0 | 2 | 4 | — | — | — |
| 29 | 1% | 10 | 0 | 1 | 4 | 0 | 1 | 1 |
| 30 | 1% | 30 | 1 | 4 | 6 | 1 | <1 | 2-3 |
| 31 | 0.5% | 10 | 1 | 1 | 3 | 0 | <1 | 1 |
| 32 | 0.5% | 30 | 0 | 1 | 2 | — | — | — |
| 33 | 7.5%[1] | 1 | 0 | 3 | 4 | 0 | 0 | 3-4 |
| 34 | 7.5%[1] | 3 | 0 | 3 | 3 | 0 | <1 | 1-2 |
| 35 | 7.5%[1] | 5 | 0 | 1 | 2 | 0 | 0 | 1 |
| 36 | 7.5%[1] | 7 | 0 | 2 | 4 | 0 | 1 | 2 |
| 37 | 7.5%[1] | 10 | 4 | 6 | 8 | <1 | 1-2 | 3-4 |
| 38 | 7.5%[1] | 30 | 3 | 5 | 7 | 0 | 1 | 3 |

[1]7.5% in deionized water. The other nitric acid solutions were in tap water.

In the above series of experiments, the most effective concentration appears to be about 5 percent nitric acid in tap water. At the lower concentrations, that is, below 5 percent, longer dip times of about 10 to 30 seconds are required to give good corrosion resistance.

With higher concentrations, shorter dip times of about 3 to 10 seconds appear to give equivalent or better results to greater immersion times.

Deionized water might be better than tap water as a dispersing medium as a 7.5 percent nitric acid solution in deionized water appeared to give better corrosion resistance than the comparable nitric acid concentration in tap water.

EXAMPLES 39-45

A series of experiments were conducted using hydrochloric acid, sulfuric acid and phosphoric acid as substitutes for nitric acid in pretreating cold roller steel panels before applying a zinc-rich primer coating. The acid concentrations chosen for these substitutes were based on the good results obtained with the 7.5 percent by weight aqueous nitric acid solutions (1.2 Normal) used in Example 1. Concentrated hydrochloric, sulfuric and phosphoric acids were diluted with deionized water to form 1.2 Normal solutions. Cold rolled steel panels were alkaline cleaned as described in Example 1 and some of the panels immersed in the substituted acid solutions for 5 seconds and other panels immersed for 10 seconds. After the panels were removed from the solutions, they were rinsed with warm tap water, blown dry, coated with a zinc-rich primer and baked as described in connection with Example 1. The coated panels were exposed to a salt spray fog in accordance with ASTM B-117-64 and after one week, developed heavy blisters over the face of the coated panel.

Additional substituted acid solutions were prepared with the exception that the normality of the sulfuric and phosphoric acids were doubled. An additional series of cold rolled steel panels were immersed in these more concentrated acid solutions, treated and coated with the zinc-rich primer and baked as described immediately above. After one week of salt spray exposure, heavy blisters developed over the coated faces of the panels.

EXAMPLES 46-48

A series of experiments were conducted using picric acid (as described in U.S. Pat. No. 2,853,406), hydrofluoric acid and chromic acid as a substitute for nitric acid in pretreating cold rolled steel panels before applying a zinc-rich primer coating. For purposes of control, a nitric acid pretreatment as described in Example 1 was also evaluated.

Cold rolled steel panels were alkaline cleaned as described in Example 1. One panel was immersed in a 4 percent by weight picric acid solution at a temperature of 155° F. (68° C.) for 12 seconds (as described in Example III of U.S. Pat. No. 2,853,406). A second panel was immersed in 1.2 N hydrofluoric acid for 5 seconds at a bath temperature of 22° C. Other panels were immersed in various chromic acid solutions at 1, 5, 10 and 20 percent by weight concentrations for 5, 10, 20 and 30 seconds at each concentration. The panels were removed from the treating solutions, rinsed with warm tap water, blown dry, coated with the zinc-rich primer and baked as described in connection with Example 1. The coated panels were then subjected to an Olsen draw, 88 inch-pounds of reverse impact, scribed with a line, given a 90° bend and exposed to a salt spray fog in accordance with ASTM B-117-64. After various periods of time in the salt spray chamber as reported in Table III below, the panels were evaluated.

TABLE III

Salt Spray Exposure Results

| Example No. | Salt Spray Exposure, in Hours | Olsen Draw | Reverse Impact | Creepage from Scribe Line, in millimeters | Rust in Area of 90° Bend | Face Rusting |
|---|---|---|---|---|---|---|
| 46 (picric acid) | 456 | totally rusted | → | → | → | → |
| 47 (hydrofluoric acid) | 456 | totally rusted | → | → | → | → |
| 48 (chromic acid, all concentrations and times) | 200 | totally rusted | → | → | → | → |
| Control (1.2 Normal nitric acid) | 1100 | 1–2 | | 1.5–2.0 | slight red rust | none |

EXAMPLE 49

A cold rolled steel panel coated in the manner generally described in Example 1 was prepared, with the exception that the panel was cleaned by degreasing in trichloroethylene vapor instead of being alkaline cleaned as described in Example 1. After vapor degreasing, the panel was treated with nitric acid and coated with the zinc-rich primer as described in Example 1. The coated panel was given an Olsen draw, 80 inch-pounds of reverse impact, scribed, and given a 90° bend.

After 1100 hours in salt spray, the panel showed essentially no rust in the area of the Olsen draw, of the reverse impact indentation and of the 90° bend. There was only one millimeter of creepage from the scribe mark and the face was clean and free of rust.

EXAMPLES 50–58

A series of zinc-rich primer compositions were prepared similar to that of Example A with the exception that the phenoxy resin binder was replaced with a lower molecular weight epoxy resin and various curing agents. The epoxy resin was a polyglycidyl ether of Bisphenol A having a molecular weight of about 5000–8000 and commercially available from Shell Chemical Company under the trademark EPON 1009.

The various curing agents chosen are reported in Table IV below.

Cold rolled steel panels were alkaline cleaned, treated with nitric acid as described in Example 1 and coated with zinc-rich primers employing the various binders shown in the table below. The panels were cured as generally described in Example 1 and the panels subjected to an Olsen draw, a reverse impact, scribed and given a 90° bend. The panels were then subjected to salt spray exposure as generally described in Example 1. The results are reported in Table IV below.

TABLE IV

Salt Spray Exposure Results

| Example No. | Resinous Binder | Salt Spray Exposure, in hours | Olsen Draw | Reverse Impact | Creepage from Scribe Line, in mm | Rust in Area of 90° Bend | Face Rusting |
|---|---|---|---|---|---|---|---|
| 50 | EPON 1009:RESIMENE 915[1] (80/20 weight ratio) | 840 | 2–4 | 4–5 | 0.5–1.0 | 0 | clear |
| 51 | EPON 1009:RESIMENE 915 (70/30 weight ratio) | 840 | 2–3 | 0–1 | 0 | 0 | slight red rust |
| 52 | EPON 1009:RESIMENE 740[2] (70/30 weight ratio) | 840 | 1–2 | 0–1 | 1 | 0 | none |
| 53 | EPON 1009:RESIMENE 740 (60/40 weight ratio) | 840 | 0 | 0 | 0 | 0 | none |
| 54 | EPON 1009:CYMEL 1123[3] (80/20 weight ratio) | 768 | 5 | 3 | 2.0 | slight red rust | none |
| 55 | EPON 1009:METHYLON 75108[4] (90/10 weight ratio) | | 0 | 0 | 1 | 0 | none |
| 56 | EPON 1009-METHYLON 75108 (80/20 weight ratio) | 768 | 1 | 0 | 1 | 0 | none |
| 57 | EPON 1009:METHYLON 75202[5] (80/20 weight ratio) | | 3 | 0 | 1 | 0 | none |
| 58 | EPON 1009:METHLON 75202 (70/30 weight ratio) | 768 | 0 | 0 | 0 | 0 | none |

[1]RESIMENE 915, a butylated urea-formaldehyde resin commercially available from Monsanto Chemical Company.
[2]RESIMENE 740, melamine-formaldehyde condensate commercially available from Monsanto Chemical Company.
[3]CYMEL 1123, mixed methylolated-ethylolated benzoguanamine-formaldehyde resin commercially available from American Cyanamid Co.
[4]METHYLON 75108, mixed allyl ethers of mono-, di- and trimethylol phenols commercially available from General Electric Co.
[5]METHYLON 75202, a phenolic mixture containing a large amount of allyl ethers of mono-, di- and trimethylol phenols commercially available from General Electric Company.

EXAMPLES 59–65

A series of experiments were conducted to determine the effect of aging the nitric acid-treated steel panels before applying the zinc-rich primer coating.

Cold rolled steel panels were alkaline cleaned, treated with 7.5 percent aqueous nitric acid, rinsed and dried as generally described in Example 1. The treated panels were placed in racks and aged at 50 percent relative humidity for the various periods of time shown in Table V below. The panels were coated with the zinc-rich primer and baked as generally described in Example 1 and then subjected to an Olsen draw, scribed and exposed to a salt spray fog for 336 and 500 hours. The results of the exposure are reported in Table V below. For the purpose of comparison, a cold rolled steel panel coated with ZINCROMETAL such as generally described in connection with Example 2 was also evaluated.

TABLE V

Effect of Aging Nitric Acid-Pretreated Cold Rolled Steel Surfaces

| Example No. | Time of Aging | Olsen Draw, Salt Spray in hours | | Scribe Creepage in mm, Salt Spray in hours | |
|---|---|---|---|---|---|
| | | 336 | 500 | 336 | 500 |
| 59 | 1 minute | 4 | 5 | 1-2 | 1-3 |
| 60 | 1 hour | 1 | 3 | 0 | 1-2 |
| 61 | 1 day | 4 | 6 | 0 | 1-2 |
| 62 | 1 week | 0 | 4 | <1 | 1-2 |
| 63 | 2 weeks | 0 | 2 | 0 | 1-2 |
| 64 | 4 weeks | 1 | 3 | <1 | 1-2 |
| 65 | ZINCROMETAL | 2 | 4 | 1-2 | 2-4 |

The above results seem to indicate that aging the nitric acid-treated samples does not detrimentally affect corrosion resistance of the zinc primer-coated panels.

EXAMPLES 66-74

A coil of cold rolled steel was pretreated in a continuous manner by first alkaline cleaning the steel and then etching it with nitric acid. The pretreatment was conducted by passing the coil (6 inches wide, 0.032–0.036 mil thick) at a speed of 25 feet per minute through a 1.5 percent by weight alkaline (PARCO 338) spray cleaning solution at a temperature of 120° F.–160° F. (49° C.–71° C.). After alkaline cleaning, the coil was rinsed with warm tap water, passed through squeegee rolls and then passed into a 4 percent by weight aqueous nitric acid solution to etch the surface of the steel. The residence time of the coil in the nitric acid bath was about 10 seconds, after which time the coil was removed, rinsed with warm tap water and blown dry. Eight panels were cut from the coil and set aside for coating. Four of the panels were coated with the zinc-rich primer used in Example 1 by drawing down with a 022 wire wound drawbar. The coated panels were baked in an oven for various periods of time to reach a peak metal temperature of 425° F., 400° F., 375° F. and 350° F., respectively (218° C., 204° C., 191° C. and 177° C., respectively). The dry film thickness of the zinc-rich primer on each of the panels was about 0.6 mil. After cooling to room temperature, the panels were then subjected to the simulated draw bead coating adhesion test (double draw dressed with 600 grit emery paper between the draws). The results of the test are reported in Table VI below. The other four panels were coated with a zinc-rich primer by drawing down with drawbars such that the dry film thicknesses after baking were 0.3 mil, 0.4 mil, 0.5 mil and 0.7 mil, respectively. The coated panels were baked in an oven to reach a peak metal temperature of 425° F. (218° C.). The panels were removed from the oven and cooled to room temperature and subjected to the simulated draw bead coating adhesion test as described immediately above. The results are reported in Table VI below.

For the purposes of comparison, a panel coated with ZINCROMETAL as described above in connection with Example 2 was also subjected to the simulated draw bead coating adhesion test and the results are reported in Table VI below.

TABLE VI

Test Results of Double Draw Bead Adhesion Test

| Example No. | Panel Description | | | Results |
|---|---|---|---|---|
| | Thickness of Coating in mils | Peak Metal Temperature °F. | °C. | |
| 66 | 0.6 | 425 | 218 | <1 percent coating removal |
| 67 | 0.6 | 400 | 204 | <1 percent coating removal |
| 68 | 0.6 | 375 | 191 | about 2 percent coating removal |
| 69 | 0.6 | 350 | 177 | about 2 percent coating removal |
| 70 | 0.3 | 425 | 218 | about 2 percent coating removal |
| 71 | 0.4 | 425 | 218 | about 1 percent coating removal |
| 72 | 0.5 | 425 | 218 | about 1 percent coating removal |
| 73 | 0.7 | 425 | 218 | about 1 percent coating removal |
| 74 | ZINCROMETAL | | | about 10 percent metal removal at the edge of the panel |

EXAMPLES 75-79

A series of cold rolled steel panels were treated and coated with a zinc-rich primer as generally described in Example 1 with the exception that the coated panels were baked in a box oven at 800° F. (427° C.) for varying periods of time to reach peak metal temperatures reported in Table VII below. The coated panels were cooled to room temperature and subjected to an Olsen draw and 80 inch-pounds of reverse impact. The dome area was taped with 3M No. 710 tape, the tape pulled off the dome area at an angle of 90°. The tape was impressed on white paper and the degree of coating pick-off determined by photographic standards with 10 being perfect with no coating pick-off and 2 the worst rating. For the purpose of comparison, a cold rolled steel panel coated with ZINCROMETAL such as generally described in connection with Example 2 was also evaluated. The results are reported in Table VII below.

TABLE VII

Coating Pick-Off Results of Cold Rolled Steel Panels Coated with Zinc-Rich Primer and Baked at Various Temperatures

| Example No. | Peak Metal Temperatures | | Olsen Draw | Reverse Impact |
|---|---|---|---|---|
| | °F. | °C. | | |
| 75 | 400 | 204 | 10 | 10 |
| 76 | 425 | 218 | 10 | 10 |
| 77 | 450 | 232 | 10 | 10 |
| 78 | 475 | 246 | 10 | 10 |
| 79 | ZINCROMETAL | | 7 | 8 |

EXAMPLES 80-85

Two 4 inch by 4 inch cold rolled steel panels (Examples 80 and 81) having a thickness of about 0.32 mil were alkaline cleaned, etched with 7.5 percent aqueous nitric acid for 5 seconds and coated with the zinc-rich primer as generally described in Example 1. The panels were baked in an electric oven at 800° F. (427° C.) for 28 seconds to reach a peak metal temperature (PMT) of 425° F. (218° C.), removed from the oven, cooled to room temperature and then subjected to a Taber abrasion test. The dry film thickness of the zinc-rich primer was 0.55–0.60 mil. Two other panels (Examples 82 and 83) were alkaline cleaned and pretreated as generally described in Example 3 and coated with a zinc-rich primer. The coated panels were baked in an oven to reach a peak metal temperature of 475° F. (246° C.) after which time they were cooled to room temperature and subjected to the Taber abrasion test. Dry film thickness of these samples was also 0.55–0.60 mil.

For the purposes of comparison, two cold rolled steel panels (Examples 84 and 85) each coated with ZINCROMETAL as generally described in Example 4 above having a dry film thickness of about 0.6 mil were also subjected to the Taber abrasion test. The results of the test are reported in Table VIII below.

The Taber abrasion test was done with a Taber Telidyne Abrader using CS17 abrasion wheels.

TABLE VIII

Results of Taber Abrasion Test of Zinc-Rich Primer Coatings

| Example No. | Panel Description | Weight Loss of Primer Coating in Milligrams per Panel (cumulative values) | | | |
|---|---|---|---|---|---|
| | | 100 cycles | 200 cycles | 300 cycles | 500 cycles |
| 80 | zinc-rich primer 425° F. (218° C.) PMT | 7.3 | 17.7 | 23.7 | 32.6 |
| 81 | zinc-rich primer 425° F. (218° C.) PMT | 7.8 | 15.9 | 20.8 | 29.2 |
| 82 | zinc-rich primer 475° F. (246° C.) PMT | 17.2 | 25.7 | 32.4 | 45.2 |
| 83 | zinc-rich primer 475° F. (246° C.) PMT | 8.4 | 15.2 | 22.5 | 34.9 |
| 84 | ZINCROMETAL | 50.2 | 75.7 | 90.6 | 105.5 |
| 85 | ZINCROMETAL | 42.9 | 71.1 | 87.4 | 103.2 |

According to the provisions of the Patent Statutes, there are described above the invention and what are now considered to be its best embodiments. However, within the scope of the appended claims, it is to be understood that the invention can be practiced otherwise than as specifically described.

We claim:

1. An improved method of providing corrosion resistance to a ferrous metal substrate which involves the application of a zinc-rich coating to the surface of the substrate, the improvement comprising:
   (A) treating the surface of the ferrous metal substrate by contacting the ferrous metal substrate for at least one and up to 60 seconds with 1 to less than 20 percent by weight of aqueous nitric acid followed by
   (B) directly applying to said previously treated surface a zinc-rich coating which contains at least 30 percent by volume pulverulent zinc in a resinous binder.

2. The method of claim 1 in which the metal substrate is cleaned and degreased before the nitric acid treatment.

3. The method of claim 2 in which the metal substrate is cleaned and degreased with an alkaline cleaning solution.

4. The method of claim 1 in which the nitric acid treatment is conducted by immersing the ferrous metal substrate in a nitric acid bath.

5. The method of claim 1 in which the nitric acid is sprayed onto the ferrous metal surface.

6. The method of claim 1 in which the nitric acid is applied to the ferrous metal surface by reverse roll coating.

7. The method of claim 1 in which the zinc-rich coating contains about 50 to 60 percent by volume pulverulent zinc.

8. The method of claim 1 in which the majority of particles of pulverulent zinc have a particle size less than 20 microns.

9. The method of claim 1 in which the resinous binder is a resin prepared from an epoxy-containing material.

10. The method of claim 9 in which the resin is prepared by condensing an epichlorohydrin or a dihalohydrin with Bisphenol A.

11. The method of claim 10 in which the resin has a weight average molecular weight of at least 18,000.

12. The method of claim 1 in which the zinc-rich coating composition is applied to the treated surface and then cured to form a coating having a dry film thickness of about 0.1 to 10 mils.

13. The method of claim 12 in which the coated metal substrate is subsequently topcoated.

14. The method of claim 13 in which the topcoat is applied by electrodeposition.

15. The method of claim 14 in which the electrodeposited coating is applied by cationic electrodeposition.

16. A ferrous metal article coated by the method of claim 1.

17. A ferrous metal article coated by the method of claim 13.

18. A ferrous metal article coated by the method of claim 14.

19. A ferrous metal article coated by the method of claim 15.

20. The coated ferrous metal article of claim 19 which is in the form of coated coil metal.

* * * * *